(12) United States Patent
Marsetti et al.

(10) Patent No.: US 6,536,584 B2
(45) Date of Patent: Mar. 25, 2003

(54) CLAMP AND SUPPORT AND CONNECTION MEMBERS

(75) Inventors: Sergio Marsetti, Castelli Calepio (IT); Rodolfo Reatti, Brivio (IT)

(73) Assignee: System Plast, S.p.A., Telgate (IT)

( * ) Notice: Subject to any disclaimer, the term of this patent is extended or adjusted under 35 U.S.C. 154(b) by 20 days.

(21) Appl. No.: 09/907,357

(22) Filed: Jul. 17, 2001

(65) Prior Publication Data

US 2002/0060144 A1 May 23, 2002

(30) Foreign Application Priority Data

Jul. 18, 2000 (IT) .................................... MI2000422 U

(51) Int. Cl.⁷ ............................................... B65G 21/20
(52) U.S. Cl. ................... 198/836.3; 24/698; 248/228.4
(58) Field of Search ................... 198/836.3; 24/658, 24/656; 248/228.4, 229.13; 211/182; 403/389

(56) References Cited

U.S. PATENT DOCUMENTS

| | | | | |
|---|---|---|---|---|
| 2,798,591 A | * | 7/1957 | Stamos | 198/192 |
| 4,225,035 A | * | 9/1980 | Mohney et al. | 198/836 |
| 5,267,642 A | * | 12/1993 | Gharpurey et al. | 198/836.3 |
| 5,492,218 A | * | 2/1996 | Falkowski | 198/836.3 |
| 5,533,826 A | * | 7/1996 | Cairns | 403/389 |
| 5,626,221 A | * | 5/1997 | Ledingham | 198/836.3 |
| 5,692,596 A | * | 12/1997 | Ledingham | 198/836.3 |
| 5,701,991 A | * | 12/1997 | Helmetsie | 198/836.1 |
| 5,860,511 A | * | 1/1999 | Ensch et al. | 198/836.3 |
| 5,927,480 A | * | 7/1999 | McCaffrey et al. | 198/836.3 |
| 6,059,096 A | * | 5/2000 | Gladieux | 198/836.3 |
| 6,260,245 B1 | * | 7/2001 | Marsetti | 24/658 |

* cited by examiner

*Primary Examiner*—Christopher P. Ellis
*Assistant Examiner*—Rashmi Sharma
(74) *Attorney, Agent, or Firm*—Steinberg & Raskin, P.C.

(57) ABSTRACT

A clamp for locking at least one pin (12) or the like, for use in conveyor belts or conveying devices in general, comprising a body (1) provided with coaxial apertures (5) and housing, slidable but unable to rotate, a spring-loaded (7) movable member (9) which is provided with a through hole (10) to be aligned with the apertures (5) for the passage of the pin (12) and connected axially to a control knob (11), in which the body (1) presents a portion (2) of rectilinear axis (X) and a connection portion (3) terminating with an at least approximately flat face (4) which forms with the rectilinear axis (X) an angle (a) less than 90°, the common axis (6) of the coaxial apertures (5) being substantially perpendicular to the plane in which the face (4) lies.

12 Claims, 1 Drawing Sheet

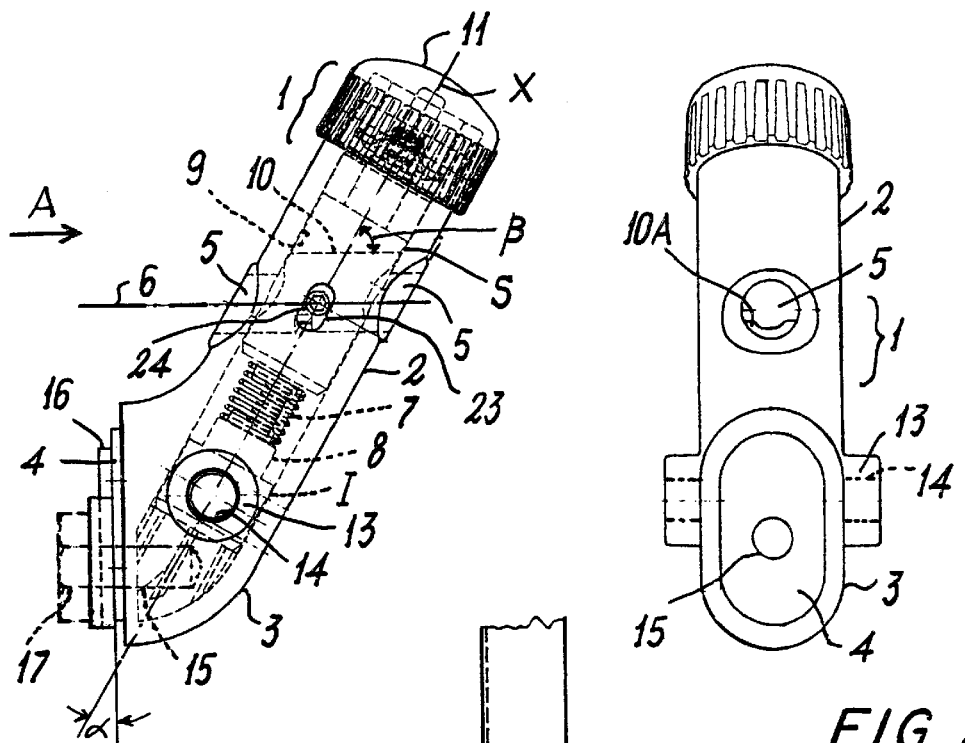
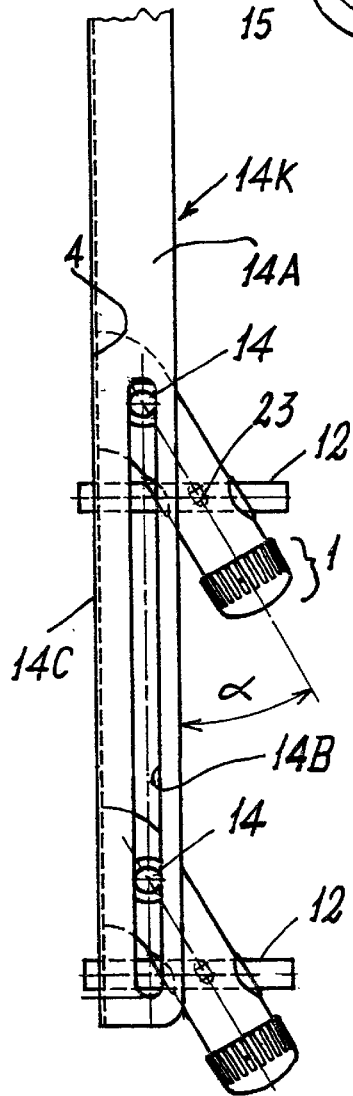
FIG. 1
FIG. 2
FIG. 3

CLAMP AND SUPPORT AND CONNECTION MEMBERS

BACKGROUND OF THE INVENTION

The present invention relates to a clamp for support and connection members, such as pins and the like, particularly but not exclusively used in the conveyor belt sector for supporting the relative guides, for example lateral guides.

With particular but not exclusive reference to conveyor belts, these are known to comprise lateral guides formed, for example, from longitudinal profile bars supported by pins mounted in clamps. With these known clamps, said pins are tightened by screw means and can be adjusted by slackening and tightening these latter. The operations involved in slackening and tightening these screw means in order to position the lateral guides in the desired manner are relatively burdensome in terms both of time and of the force required, especially considering that in a conveyor belt system of one and the same production plant many hundreds if not thousands of clamps can be present.

Other utility models of the present applicant (M198UO00296 and M199UO00397) describe a clamp which eliminates the need to use screw means for locking the clamped piece or component (for example pin) by entrusting their tightening to the action of elastic means, and their slackening to a manual action opposing that of said elastic means.

The clamps, including those of the aforesaid utility models, are generally supported by profile bars, plates or other structural members of the conveyor belts. The clamps supported in this manner project perpendicularly from said members, to hence create relatively considerable problems during the conveyor belt installation if the available space is relatively small or if space intended for another purpose cannot be used.

OBJECTS AND SUMMARY OF THE INVENTION

The main object of the present invention is to provide a clamp of the same type as the preceding utility model of the present applicant, but formed in such a manner as to avoid the installation difficulties related to space availability.

These and further objects which will be more apparent from the ensuing detailed description are attained by a clamp in accordance with the present invention.

BRIEF DESCRIPTION OF THE DRAWINGS

The invention will be more apparent from the ensuing description, which is provided by way of example, with reference to the accompanying drawing, in which:

FIG. 1 is a side view of a clamp of the invention, with internal parts visible by transparency;

FIG. 2 is a view in the direction of the arrow A of FIG. 1;

FIG. 3 is a side view of a pair of clamps secured to a profile bar.

DETAILED DESCRIPTION OF THE INVENTION

With reference to the figures, the clamp comprises an outer body 1, constructed of a known plastic material, for example an engineering polymer. The body is of elbow shape, in the sense that an externally cylindrical portion 2 of axis X is followed by an arched portion 3 terminating with a substantially flat face 4 which with said axis X forms an angle alpha ($\alpha$) less than 90°, advantageously not greater than 45°, and preferably 30°. The body presents an axial hole (closed at the elbow) which in its upper portion S (in FIG. 1) presents a polygonal cross section, for example hexagonal. This upper portion is followed by a substantially circular lower portion (in FIG. 1).

The body 1 presents in the cylindrical portion 2 a pair of opposing coaxial apertures 5, the common axis 6 of which forms with the axis X an angle $\beta$=90°-a, i.e. the axis 6 is perpendicular to the plane in which the face 4 lies.

In a similar manner to that described in the preceding utility models of the applicant, there is mounted in the body 1 a compression spring 7 acting on a member 9 of polygonal cross-section which matches that of the portion 5, so that it is able to slide but not rotate therein. At its other end, the spring acts on a spring guide 8.

In the member 9 there is provided a through hole 10 the axis of which forms said angle $\beta$ with the axis X. A tooth 10A projects into said hole (FIG. 2), to engage in an annular groove provided in the outer surface of the pin inserted into the hole, and hence retain it in the correct position.

The body 1 is also provided with a knob 11 connected axially to the movable member 8. As stated in utility model M199UO0037, to which reference should be made, the knob 11 controls the locking and release of the piece (for example a pin 12) inserted into the holes 5, 10. In this respect, the knob 11 comprises means able to cause it to assume and maintain two positions, namely one in which the pin 12 is released by moving said member 9 against the action of the spring 7, and one in which the pin is locked by the action of the spring. Alternatively, as shown in utility model M198UO00296, to limit the upward travel of the movable member 9, a stop ring can be provided snap-fitted into an annular groove in the inner wall of that seat in the body 1 into which the member 9 is inserted.

In a position corresponding with the apertures 5 and the through hole 10, the body 1 also comprises an aperture 23 within which a setscrew 24 can move, this engaging a threaded through hole provided in the movable member 9 in a position corresponding with the hole 10. The setscrew 24 ensures that the movable member 9 does not rotate, and that consequently the hole 10 remains always perfectly aligned with the apertures 5 and is unable to move out of alignment, for example because of vibration due to the conveying of the work pieces. The setscrew 24 can also be used to lock in a desired position the pin inserted into the hole 10 and into the apertures 5.

In one embodiment of the invention the body 1 presents two coaxial projections 13 in the body portion 3. Their axis is parallel to the face 4 and intersects the axis X at 90°. They are holed and threaded at 14, to enable the clamp to be connected (see FIG. 3) by screw means to a support member, for example a channel shaped (for example U-shaped) profile bar 14 which, to enable the clamp to be adjusted in height, can be provided on its flanges 14A with longitudinal elongate apertures 14B. It will be apparent that the pin 12 passes through a corresponding longitudinal aperture present in the base 14C of the profile bar 14.

The dimensioning of those parts cooperating in the fixing of the clamp to the profile bar is such that the flat face 4 of the body 1 adheres against the base 14C of the profile.

In another embodiment, the body 1 presents in the flat face 4 of the portion 3 a threaded hole 15 enabling the clamp to be fixed to flat support element 16 by screws 17.

The two embodiments (i.e. threaded holes 14 and 15) can coexist as shown in the drawings (giving rise to a third solution) or be alternatives. The present invention embraces the three embodiments.

By virtue of the particular formation of the body and of the clamp parts (holes 5, member 9 with hole 10) correct orientation of the pins 12 is achieved (for example horizontal) with (importantly) a substantial reduction in overall clamp size in that direction which in FIG. 3 is shown by way of example to the right of the support member 14, this being achieved because of the position inclined to the support member (for example 14) which the clamps assume when in use

We claim:

1. A clamp for locking at least one pin (12), for use in conveyor belts or conveying devices in general, comprising a body (1) provided with coaxial apertures (5) and a housing, slidable but unable to rotate, a spring-loaded (7) movable member (9) which is provided with a through hole (10) to be aligned with said apertures (5) for the passage of said pin (12) and connected axially to a control knob (11), wherein the body (1) presents a portion (2) of rectilinear axis (X) and a connection portion (3) terminating with an at least approximately flat face (4) which forms with said rectilinear axis (X) an angle (a) less than 90°, the common axis (6) of said coaxial apertures (5) being substantially perpendicular to the plane in which said face (4) lies.

2. A clamp as claimed in claim 1, wherein the angle formed between the face (4) and the rectilinear axis (X) is less than or equal to 45°.

3. A clamp as claimed in claim 1, wherein in the approximately flat face (4) of the body (1) there is provided a threaded hole (15) with its axis perpendicular to said face.

4. A clamp as claimed in claim 1, wherein coaxial threaded holes (14) are provided in projecting parts (13) of the body (1), the axis of said holes (14) being parallel to the face 4 and intersecting the rectilinear axis X at 90°.

5. A clamp as claimed in claim 1, wherein the angle formed between the face (4) and the rectilinear axis (X) is equal to 30°.

6. A clamp as claimed in claim 1, wherein the slidable member (9) is not rotatable.

7. A clamp as claimed in claim 1, wherein the control knob (11) comprises means for causing it to assume and maintain two positions, namely one in which the pin (12) is released by moving said member (9) against the action of the spring (7), and one in which the pin is locked by the action of the spring.

8. A clamp as claimed in claim 1, wherein inside the hole (10) provided in the slidable member (9) there is a tooth (10A) arranged to cooperate with at least one annular groove provided in the outer surface of the pin (12).

9. A clamp as claimed in claim 1, wherein the connection portion (3) is arched.

10. A clamp as claimed in claim 1, wherein in a position corresponding with the apertures (5) and the through hole (10), the body (1) comprises an aperture (23) within which a setscrew (24) secured to the movable member (9) can move.

11. A clamp as claimed in claim 10, wherein the setscrew (24) engages in a threaded through hole provided in the movable member (9) in a position corresponding with the hole (10).

12. A support structure for a clamp claimed in claim 1, comprising a substantially U-shaped section in which the two parallel walls (14A) each comprise a first longitudinal elongate aperture (14B) for passage of a fixing means, a third wall (I 4C), perpendicular to the first two, comprising a second longitudinal elongate aperture for passage of a portion of the pin (12).

* * * * *

UNITED STATES PATENT AND TRADEMARK OFFICE
CERTIFICATE OF CORRECTION

PATENT NO.    : 6,536,584 B2
DATED         : March 25, 2003
INVENTOR(S)   : Sergio Marsetti et al.

It is certified that error appears in the above-identified patent and that said Letters Patent is hereby corrected as shown below:

<u>Title page, Item [54] and Column 1, lines 1 and 2,</u>
Title should read -- CLAMP FOR SUPPORT AND CONNECTION MEMBERS --

Signed and Sealed this

Twelfth Day of August, 2003

JAMES E. ROGAN
*Director of the United States Patent and Trademark Office*